May 7, 1963 V. V. PETROV ETAL 3,088,366
DEVICE FOR ELIMINATING THE NOTICEABILITY OF BANDS ON
A SCREEN AT THE JOINTS OF ADJACENT PANORAMA PICTURES
Filed June 20, 1960
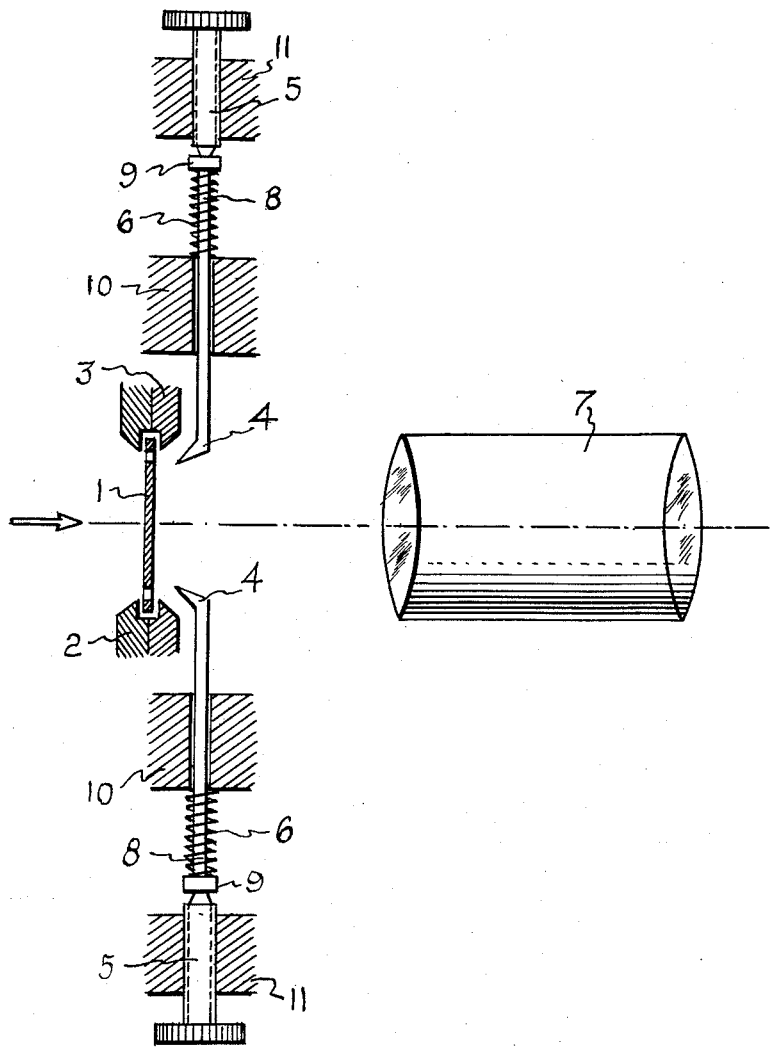

3,088,366
DEVICE FOR ELIMINATING THE NOTICEABILITY OF BANDS ON A SCREEN AT THE JOINTS OF ADJACENT PANORAMA PICTURES
Vasily Vasilievich Petrov and Alexander Dmitrievich Bodrov, both of Moscow, U.S.S.R., assignors to All-Union Research Institute of Cinematography and Photography, Moscow, U.S.S.R.
Filed June 20, 1960, Ser. No. 40,491
1 Claim. (Cl. 88—16.6)

The present invention relates to a device for eliminating the noticeability of bands on a screen at the joints of adjacent panorama pictures.

The known methods and devices for eliminating the noticeability of bands at the joint zone when showing panorama moving pictures and slides are complicated to realize and do not completely ensure the results desired.

The proposed device is simpler and more perfect and is free of the drawbacks inherent in the known devices. This is attained by installing special plates that can be moved within certain limits in the projectors outside the film plane. This considerably facilitates the demonstration of panorama films and simultaneously solves the problem of showing films produced according to any known method of three-film panorama cinematography with the aid of a projector having the proposed plates at the frame gates.

An example of practical employment of the invention is shown in the accompanying drawing, which is a horizontal cross-section of the device along the optical axis of a projector lens.

Here film 1 of the panorama film, moving in the body of film channel 2 with gate 3, is closed at both sides by darkened plates 4, which can be moved in a horizontal direction by means of micrometer screws 5, the latter overcoming the pressure of springs 6. The projector utilized with this invention includes a frame and each of the plates 4 is provided with a push rod 8 having a head 9 on the outer end thereof. The frame is provided with two pairs of spaced parallel members 10 and 11, and each push rod 8 is slidably mounted in one member 10. The compression spring 6 is disposed on each push rod 8 and abuts the associated head 9 and member 10. The head 9 on each push rod is engaged by a micrometer screw 5 threadedly mounted in the other member 11. The nearer the plates are moved to the vertical axis of the film, the wider the darkened zone will be, as the light from the source of light, which direction, is shown by an arrow passes to projector lens 7 only through the gap remaining between the plates. By lateral (horizontal) movement of the darkening plates it is possible to eliminate uneven illumination of the screen without violating the coincidence of parts of adjacent pictures. A considerable advantage of the proposed device in comparison with known devices is that it permits showing panorama films both having darkening bands and without such bands, i.e. practically all kinds of panorama films, which is impossible without the proposed device. When films are produced with darkening bands the device permits improving the quality of the picture at the joints.

We claim:

In a projection apparatus for panoramic pictures, a frame, two pairs of spaced parallel members on said frame, a projection lens, a light source, a film channel for receiving and guiding a panoramic film disposed between said lens and said light source and film masking means disposed between said film channel and said lens, said masking means comprising independently operable opposed plates slidably mounted at opposite sides of said film channel for movement toward and away from each other, a pushrod on each plate slidably mounted in one member of each pair of members, a head on each pushrod, a compression spring disposed around each pushrod, said spring engaging each head and each of said one members to urge said plates away from each other and a micrometer screw threadedly mounted in each other member of each pair of members engaging each head for moving said plates toward each other, whereby adjustment of said plates will serve to eliminate bands between adjacent projected panoramic pictures.

References Cited in the file of this patent
UNITED STATES PATENTS

| 545,423 | Chase | Aug. 27, 1895 |
| 1,479,211 | Ames et al. | Jan. 1, 1924 |
| 2,544,116 | Waller et al. | Mar. 6, 1951 |